US011121910B2

(12) United States Patent
Hall et al.

(10) Patent No.: US 11,121,910 B2
(45) Date of Patent: Sep. 14, 2021

(54) EFFICIENT INGRESS-CONGRUENCY DETERMINATION IN A NETWORK

(71) Applicant: Honeywell International Inc., Morris Plains, NJ (US)

(72) Inventors: Brendan Hall, Eden Prairie, MN (US); William Todd Smithgall, League City, TX (US); Paul Frederick Dietrich, Brooklyn Park, MN (US); Ted Bonk, Cave Creek, AZ (US); Kevin Raymond Driscoll, Maple Grove, MN (US)

(73) Assignee: Honeywell International Inc., Charlotte, NC (US)

( * ) Notice: Subject to any disclaimer, the term of this patent is extended or adjusted under 35 U.S.C. 154(b) by 0 days.

(21) Appl. No.: 16/600,396

(22) Filed: Oct. 11, 2019

(65) Prior Publication Data
US 2020/0195490 A1 Jun. 18, 2020

Related U.S. Application Data

(60) Provisional application No. 62/779,387, filed on Dec. 13, 2018, provisional application No. 62/779,287, filed on Dec. 13, 2018.

(51) Int. Cl.
H04L 12/24 (2006.01)
H04L 12/26 (2006.01)

(52) U.S. Cl.
CPC ...... *H04L 41/0654* (2013.01); *H04L 41/0695* (2013.01); *H04L 41/0836* (2013.01);
(Continued)

(58) Field of Classification Search
CPC ............. H04L 41/0654; H04L 41/0836; H04L 41/0893; H04L 41/0695; H04L 43/12;
(Continued)

(56) References Cited

U.S. PATENT DOCUMENTS 4,323,966 A * 4/1982 Whiteside ........... G06F 11/0709
714/1
7,472,859 B2 1/2009 McMahan
(Continued)

FOREIGN PATENT DOCUMENTS

CN 105871737 A * 8/2016
EP 3148154 A1 3/2017

OTHER PUBLICATIONS

European Patent Office, "Extended European Search Report from EP Application No. 19202881.9", from Foreign Counterpart to U.S. Appl. No. 16/600,396, dated May 15, 2020, pp. 1 through 11, Published: EP.

(Continued)

*Primary Examiner* — Oanh Duong
(74) *Attorney, Agent, or Firm* — Fogg & Powers LLC

(57) ABSTRACT

In an embodiment, a computing node includes a computing circuit, a comparing circuit, and an indicator circuit. The computing circuit is configured to receive each of at least one input-data message. The comparing circuit is configured to compare each of the at least one received input-data message to a list of input-data-message identifiers. And the indicator circuit is configured, for each of the at least one input-data message that corresponds to a respective input-data-message identifier, to generate a respective portion of a first status message, the respective portion indicating that the input-data message was received. For example, such computing node can determine the congruency of a received input-data message between coupled redundancy circuits with reduced processing overhead, reduced message delay, and reduced message latency as compared to existing computer nodes.

20 Claims, 12 Drawing Sheets

(52) U.S. Cl.
CPC .......... *H04L 41/0893* (2013.01); *H04L 43/12* (2013.01); *H04L 43/50* (2013.01)

(58) Field of Classification Search
CPC ......... H04L 1/22; H04L 12/42; H04L 12/437; G06F 11/0772; G06F 11/165; G06F 11/1641
See application file for complete search history.

(56) References Cited

U.S. PATENT DOCUMENTS

| | | | |
|---|---|---|---|
| 2003/0061547 A1 | 3/2003 | Bartling | |
| 2003/0126347 A1* | 7/2003 | Tan | G06F 11/2007 710/313 |
| 2005/0152379 A1 | 7/2005 | Hall et al. | |
| 2007/0223533 A1* | 9/2007 | Kirrmann | H04L 41/0659 370/469 |
| 2010/0306457 A1 | 12/2010 | Wilson et al. | |
| 2013/0294227 A1* | 11/2013 | Fukuzaki | H04L 1/22 370/228 |
| 2014/0025833 A1* | 1/2014 | Kiessling | H04L 45/28 709/228 |
| 2018/0165343 A1* | 6/2018 | Fan | G06F 16/273 |
| 2020/0028709 A1* | 1/2020 | Kim | H04L 47/32 |

OTHER PUBLICATIONS

Hall et al., "Ringing Out Fault Tolerance. A New Ring Network for Superior Low-Cost Dependability", Proceedings of the 2005 International Conference on Dependable Systems and Networks (DSN'05), 2005, pp. 1 through 10, IEEE.

Kopetz et al., "The Time-Triggered Ethernet (TTE) Design", ISORC '05 Proceedings of the Eighth IEEE International Symposium on Object-Oriented Real-Time Distributed Computing, May 2005, pp. 1-12, IEEE.

* cited by examiner

EFFICIENT INGRESS-CONGRUENCY DETERMINATION IN A NETWORK

CROSS-REFERENCE TO RELATED APPLICATIONS

This application claims the benefit of U.S. Provisional Application No. 62/779,287 filed on Dec. 13, 2018 and titled "EFFICIENT SELF-CHECK REDUNDANCY COMPARISON AND INGRESS-CONGRUENCY DETERMINATION IN A NETWORK"; and U.S. Provisional Application No. 62/779,387 filed on Dec. 13, 2018 and titled "DUAL FAULT-TOLERANT NETWORK USING GUARDIAN INTERLOCKING" the contents of which are incorporated by reference in its entirety.

This application is related to U.S. Patent App. Ser. No. 16/600,390, titled "EFFICIENT SELF- CHECKING REDUNDANCY COMPARISON IN A NETWORK," filed 11 Oct. 2019; and U.S. Patent App. Ser. No. 16/600,385, titled "DUAL FAULT-TOLERANT NETWORK USING GUARDIAN INTERLOCKING," filed 11 Oct. 2019, both of which are incorporated by reference herein.

SUMMARY

In safety relevant systems, redundancy is used to protect the system from component failure. In some systems, redundancy management to provide functional integrity ensures that the system behaves as expected under a component failure, or ensures at least that the system fails in a safe manner. A simple form of functional-integrity redundancy management is the self-checking pair configuration, where two components (e.g., peer redundant nodes, or a master node and a redundant node) perform identical calculations and produce bit-for-bit identical outputs. If the two outputs differ in any way, the respective output from each node is ignored (e.g., is assumed to be invalid). This means that each of the nodes simultaneously performs the same operations on the same data to achieve, at least in fault-free operation, the same result simultaneously (or almost simultaneously).

Traditional self-checking pair configurations typically have both halves of the pair implemented in close physical proximity to one another, or use dedicated network links to adjacent nodes.

Furthermore, traditional self-checking pair configurations also typically incur software and processing overhead to maintain pair congruency and to perform comparison functions.

Said another way, to confirm the integrity/accuracy of a result, the results from the redundant nodes are compared (after appropriate synchronization, if needed to make sure that the proper bits are being compared).

If the results match, then the results are somehow indicated as being valid/accurate.

In contrast, if the results do not match, then the results are somehow indicated as being invalid/inaccurate.

This indication of valid or invalid typically is needed because one or both of the results may still propagate to other nodes of the system even if the results are deemed to be invalid.

By indicating the results as being invalid, the other receiving nodes "know" to "ignore" the invalid results or to take other actions as appropriate for receiving invalid results.

Conversely, by not indicating the result as invalid, or, equivalently, by indicating the one or more results as being valid, the other receiving nodes "know" that they can accept and use the result(s) in their respective operations.

A problem with existing redundant methods is that to compare the two or more results with one another often requires processing overhead. For example, the result from a redundant node may be loaded into respective memory on another of the redundant nodes, and then the stored result and the result generated by the other redundant node are compared by a processor (e.g., a microprocessor or microcontroller) executing a comparison instruction or instructions. This loading and executing increases the processing overhead of the redundant node (or other node) that is performing the comparison. Multiply this increase by the many redundant results needing comparison, and one can see that the increase in processing overhead can be significant.

Unfortunately, such processing overhead can reduce the available throughput of, and even cause a data-flow or data-traffic bottleneck within, the redundant system.

To prevent such a reduction in throughput and such a bottleneck in existing redundant systems, the processing power of the nodes that perform such a redundancy-validity check is increased, typically at the cost and complexity of a larger, more powerful (e.g., faster) processor.

Furthermore, to allow comparison of redundant results as described above, the processes used to generate the respective results should agree in ingress, which means that redundant results should be generated from the same input data processed in the same sequence and according to the same algorithm.

Traditional checking for ingress agreement, or congruency, includes each redundant node sending to the one or more other redundant nodes the input-data messages that it has received, receiving the input-data messages that the other redundant nodes have received, and determining whether it has received the same input-data messages as the one or more other redundant nodes.

If each redundant node confirms that it has received the same input-data messages as the other redundant nodes, then the redundant nodes process the input data in the same way (e.g., in the same sequence and according to the same algorithm) to generate respective results (the redundant nodes typically are configured, e.g., by programming, to process the input data in the same way).

In contrast, if each of one or more of the redundant nodes determines that it has not received the same input-data messages as one or more of the other redundant nodes, then the redundant nodes communicate with one another and agree how to proceed so that they generate comparable results. For example, if a first redundant node does not receive a particular input-data message, then it may request the input-data message from another node. Or, as part of the configuration of the redundant nodes, each redundant node may not use an input-data message "missing" from any one or more of the other redundant nodes. For example, the redundant nodes may agree to "skip" the part(s) of the processing that uses the "missing" input-data message, or to use a prior input-data value instead of the "missing" input-data message.

A problem with the above-described technique for checking ingress congruency is that it may severely reduce the throughput of each redundant node due to all of the message exchanges and checks, and, therefore, may reduce the available bandwidth of the redundant system due to the sending and receiving of input-data messages among the redundant nodes.

To prevent such a reduction in throughput and available bandwidth of a redundant system, the processing power of the nodes that perform such a redundancy-validity check is increased, typically at the cost and complexity of a larger, more powerful (e.g., faster) processor, and the message-exchange bandwidth of the system also may be increased to prevent the redundant nodes from "bogging down" the system.

In an embodiment, a computing node includes a computing circuit, a comparing circuit, and an indicator circuit. The computing circuit is configured to generate a first redundant message that corresponds to, and that is independent of, a source message propagating over a network during at least one time period. The comparing circuit is configured to compare information content of one or more corresponding portions of the source message and the first redundant message during each of the at least one time period to generate a comparison result. And the indicator circuit is configured to indicate whether the source message is valid or invalid in response to the comparison result.

For example, such computing node can determine the validity of a redundant result with reduced processing overhead, reduced message delay, and reduced message latency as compared to existing computer nodes.

In another embodiment, a computing node includes a computing circuit, a comparing circuit, and an indicator circuit. The computing circuit is configured to receive each of at least one input-data message. The comparing circuit is configured to compare each of the at least one received input-data message to a list of input-data-message identifiers. And an indicator circuit is configured to, for each of the at least one input-data message that corresponds to a respective input-data-message identifier, generate a respective portion of a first status message, the respective portion indicating that the input-data message was received.

For example, such computing node can determine the congruency of a received input-data message between coupled redundancy circuits with reduced processing overhead, reduced message delay, and reduced message latency as compared to existing computer nodes.

DETAILED DESCRIPTION

Embodiments of improved redundant systems and methods for checking ingress congruency to redundant nodes and for self-checking redundant results from respective redundant are described. For example, such a redundant system is configured to "offload" the above- and below-described redundancy-validity check to dedicated, non-instruction-executing (e.g., hardwired or hard-configured) hardware/circuitry that performs the validity check on a bit-by-bit basis (or otherwise on a portion-by-portion basis) as one of the redundant nodes receives the message from another of the redundant nodes so that there is no consumption of processing throughput by, and, therefore, so that there is no increase in processing overhead of, any node, and there is little to no latency or delay added to the data-message flow.

And another embodiment of an improved redundant system and method "offloads" the above- and below-described ingress-congruency check to dedicated, non-instruction-executing hardware/circuitry that generates for each redundant node, and passes among the other redundant nodes, a respective status sequence indicative of the input messages received by the redundant node. Because the status sequence is significantly smaller than the combination of all of the input-data messages, in addition to reducing the processing overhead of the respective redundant node, the dedicated hardware/circuitry reduces the load on the available bandwidth of the system because transferring status sequences among the redundant nodes consumes less bandwidth than transferring an entire set of input-data messages among the nodes.

Figure 1:
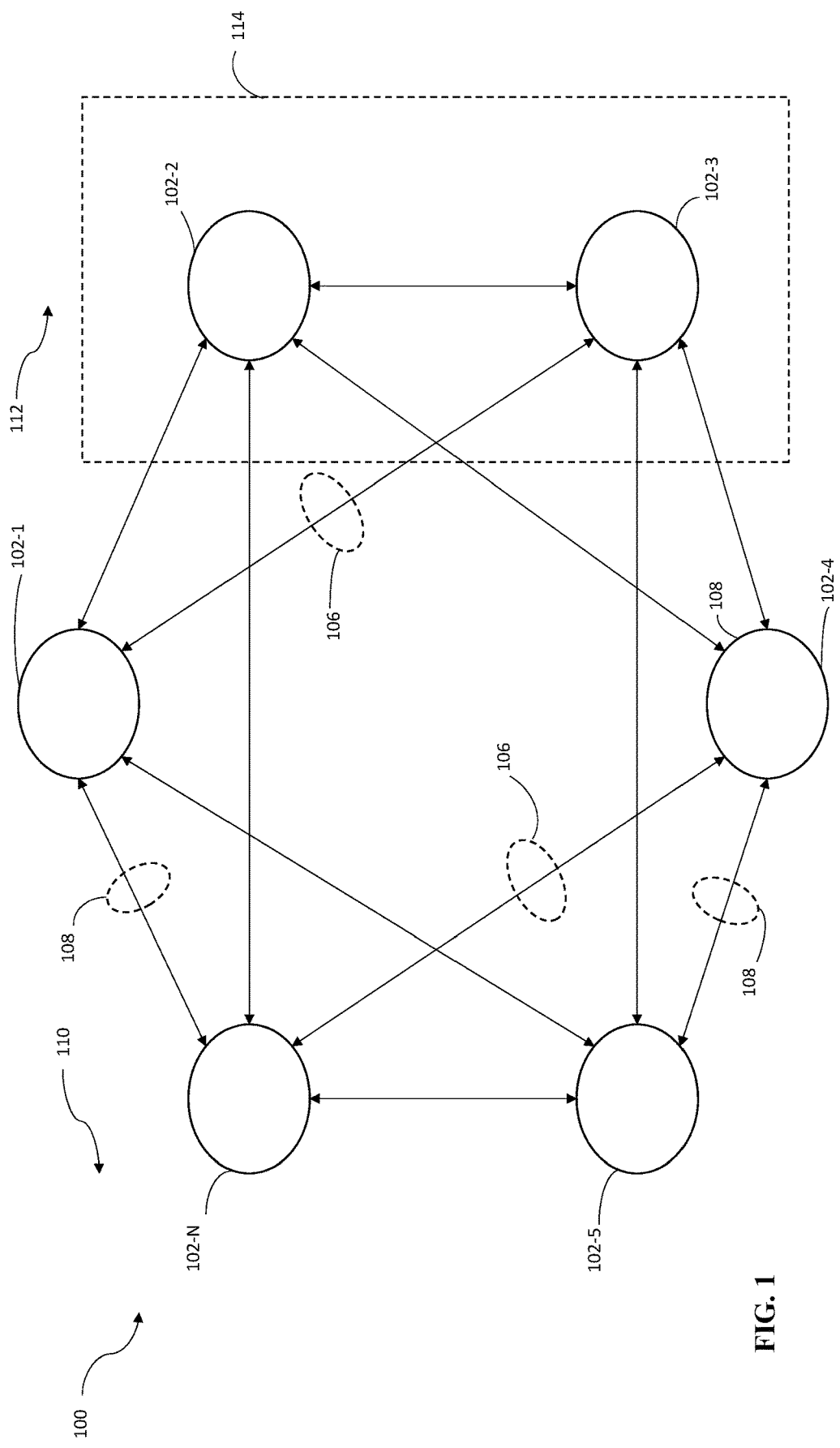
FIG. 1 is a diagram of a braided ring network of nodes, including redundancy nodes used to perform a redundancy-validity or ingress-congruency check, according to an embodiment.

FIG. 1 is a diagram of a braided network 100 in which one or more of the above-described and below-described embodiments can be used or implemented. The network 100 includes redundant nodes 102-1, 102-2, 102-3, 102-4, and 102-5, which provide data to a set number of remaining nodes 102-6 (not shown in FIG. 1) to 102-N. The redundant nodes are connected to multiple buses 106, 108 to allow each node to transmit or to receive input-data messages from another redundant node for further comparison. It is understood, however, that networks other than a braided network are also compatible with the described embodiments (e.g., a self-checking pair-configuration), such other networks including, for example, a star network and a ring network. An example of a self-checking-pair configuration is embodied in a block 114 of the network 100, the block including a pair of redundant nodes 102-2 and 102-3, which are interconnected such that each redundant node is configured to process same data according to a same algorithm as the other redundant node, and circuitry associated with the pair of nodes is configured to check the validity of the result by comparing, on a bit-by-bit basis, the respective results generated by each of the redundant nodes 102-2 and 102-3.

Ingress-Congruency Check

Figure 2:
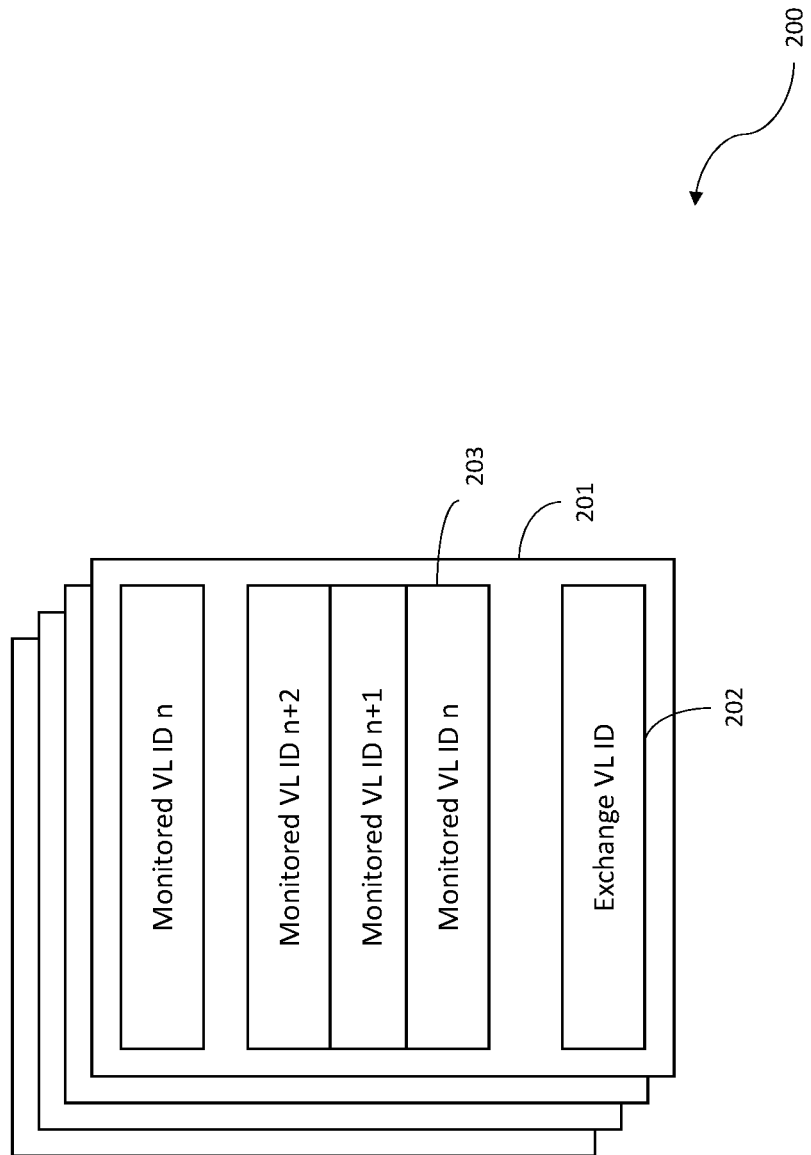
FIG. 2 is a diagram of a list of identifications (IDs) of input-data message to be received by a redundant node, and an exchange message indicating which of the input-data messages the redundant node has received, according to an embodiment.
Figure 3:
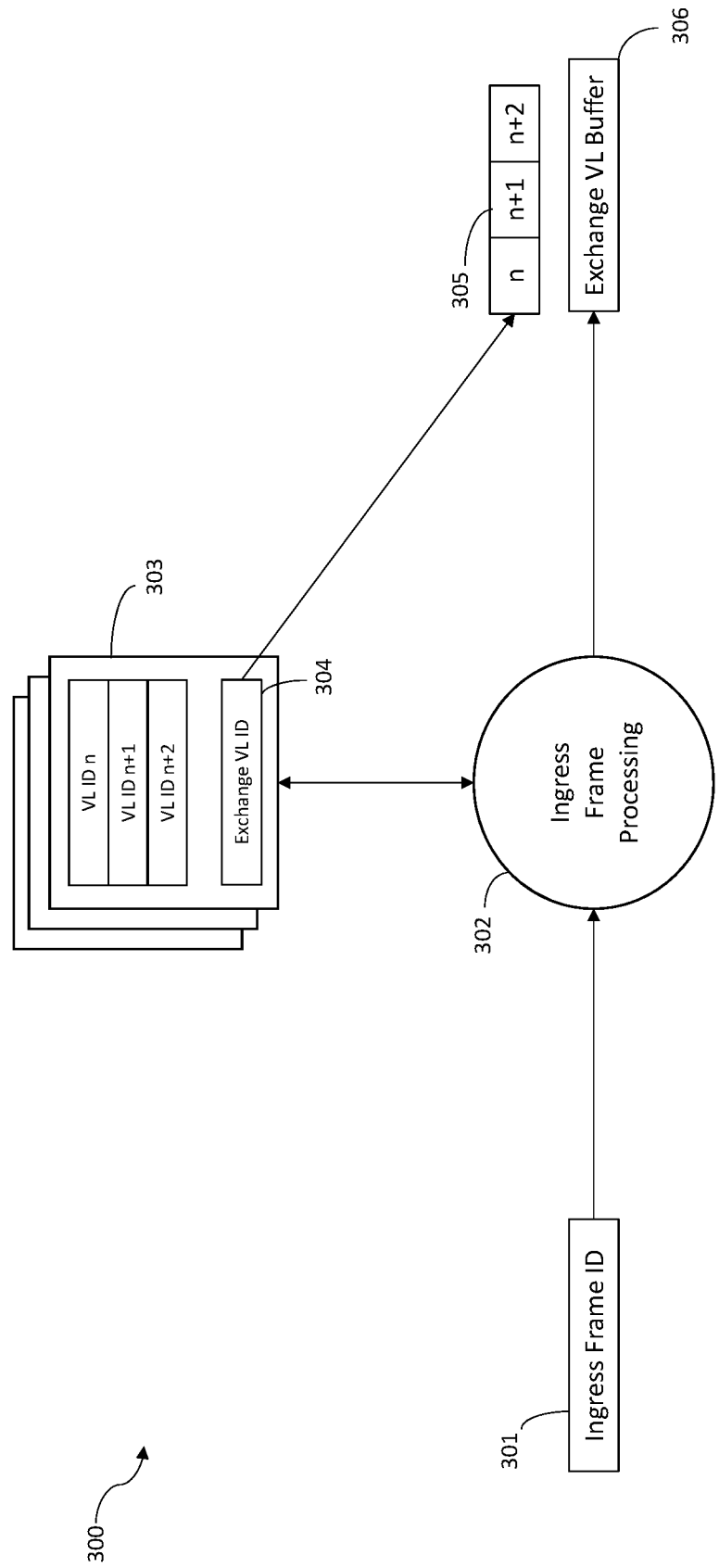
FIG. 3 is a diagram of a redundant node comparing a list of input-data message IDs to received input-data messages and populating an exchange VL buffer with the exchange message of FIG. 2, according to an embodiment.
Figure 4:
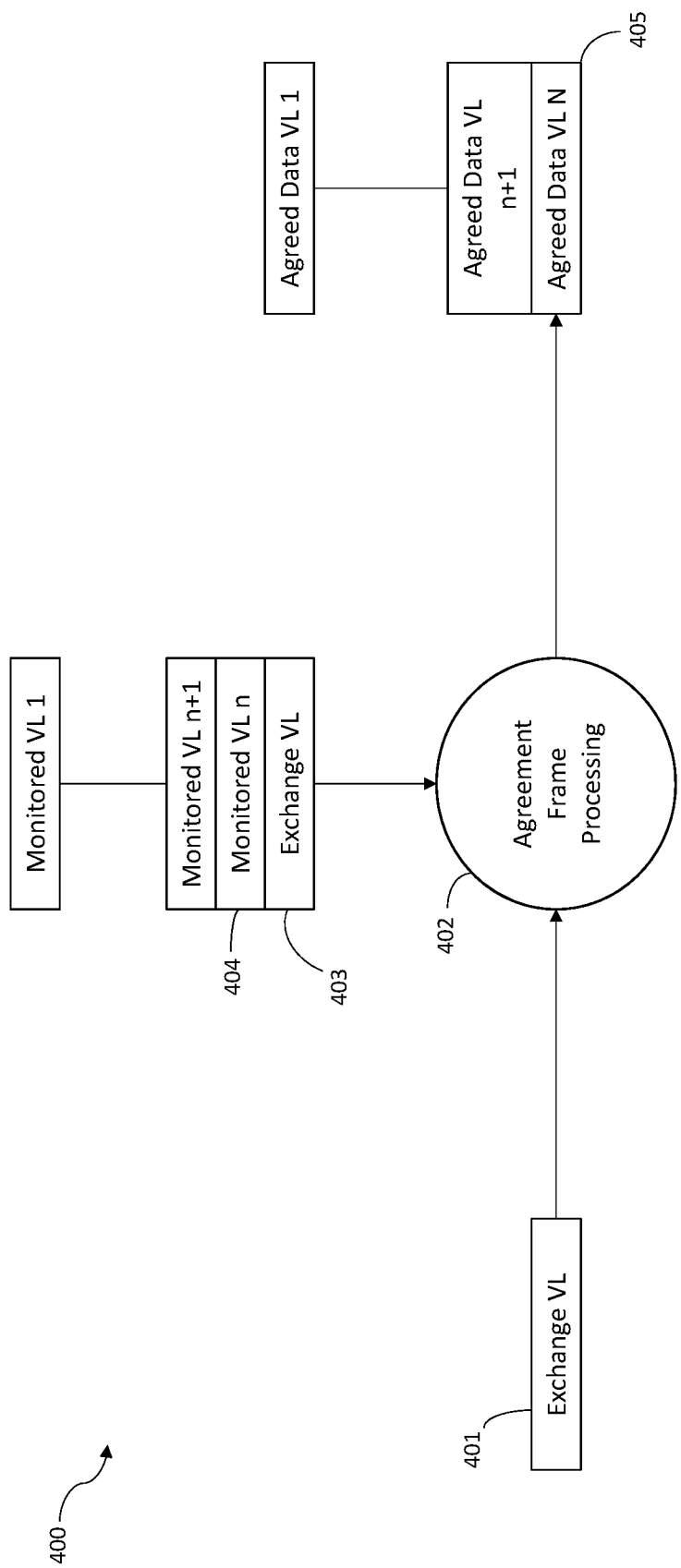
FIG. 4 is a diagram of a redundant node comparing its exchange message with the exchange message of at least one other redundant node and populating a respective agreement buffer in response to the comparison, according to an embodiment.

Referring to FIGS. 2-4, embodiments of the redundancy-validity-check technique for comparing a resulting-data message with a redundant resulting-data message to determine if the resulting-data message is valid implicitly depend on the message- and redundant-message-generating nodes receiving the same input data and performing the same operations on the same input data in the same sequence and with the same initial conditions; otherwise, the resulting-data message and resulting-redundant-data message might be different, in which case the resulting-data message would be indicated as invalid even if no error were to occur in the generation of the resulting-data message. This equality in input data, data-processing algorithm, and initial conditions, between the redundant nodes is often called "congruency between replicate task sets, or "ingress congruency." For purposes of example, it is assumed that the redundant nodes configured for ingress congruency are the nodes 102-2 and 102-3 of FIG. 1, it being understood that the forgoing and following descriptions are applicable to other sets of two or more redundant nodes.

Referring to FIG. 1, a technique for checking for congruency between redundant nodes is for each node to send to the other node(s) full copies of the input-data messages that it has received, the initial conditions of the process and operations to which the node will subject the input data contained within the input-data messages, and the process and operational sequence in which the node is configured to process the input data contained within the input-data messages.

Each redundant node compares the received information from the other redundant nodes with the same information for the node itself. If a node determines that the received information is the same as the information for the node itself, then the receiving redundant node "knows" that it and the other redundant nodes are operating congruently, that is, the redundant node "knows" that it and the other redundant nodes are operating on the same input data in the same fashion to generate the same result assuming no errors.

But a problem with some conventional congruency-check techniques is that they commandeer a significant portion of the network's communication (e.g., bus) bandwidth to send full copies of input-data messages, initial conditions, and operation sequences among redundant nodes.

Consequently, referring to FIG. 2, in an embodiment, each redundant node includes a respective list of identifiers of the input-data messages that the node is to operate on to perform a replicated (redundant) task, and uses its list and the list(s) from one or more other redundant nodes to determine ingress congruency with the one or more other redundant nodes.

As each input-data message having a matching identifier (to an identifier on the list) is received by a redundant node, the node updates a respective location (e.g., a bit, a group of bits) of a message-status buffer (e.g., the Exchange VL ID buffer 202 of FIG. 2), accordingly. For example, the node sets a respective bit, or group of bits, in the message-status buffer 202 to a logic 1, or other value, in response to receiving an input-data message corresponding to a stored (e.g., on the node) message identifier. Therefore, only the status value (the message-status-buffer contents) need be exchanged among the redundant nodes, thus reducing overhead and the portion of the network's communications bandwidth that the redundant nodes commandeer. For example, a redundant node receives an input message having an identifier "501," which is the same as one of the message identifiers 203 in the list of identifiers of input-data messages that the redundant node "expects" to receive. In response to these matching identifiers "501," the redundant node sets, to a logic 1, a bit in a location of the message-status buffer 202 corresponding to the message having the identifier "501." Consequently, the logic 1 in this bit location of the message-status buffer 202 indicates to the node, and to any other redundant nodes receiving, or otherwise having access to, the message-status buffer, that the node has received the input-data message with the identifier "501."

If the message-status-buffer contents from the other redundant nodes match the message-status-buffer 202 contents of the buffer-contents-receiving redundant node, then the buffer-contents-receiving redundant node "knows" that it and the other nodes are congruent for an associated result to be generated. The message-status-buffer 202 contents of a node can be shared with one or more other redundant nodes one time after the buffer is full, or can be shared more often as the buffer is populated with contents (as he node receives data-input messages). Furthermore, each redundant node can "hold" its result until it confirms, via a comparison of its message-status-buffer 202 contents with the message-status-buffer contents of each of the one or more other redundant nodes, that it is congruent with all other redundant nodes.

Moreover, the message-status-buffer 202 contents can include values other than message-identifier-matching indicators 203. For example, the message-status-buffer 202 contents can include initial conditions, or initial-condition-matching indicators. Or each redundant node can have a separate status buffer (not shown in FIG. 2) for initial-condition matching. In addition, if a redundant node determines that it is not congruent with at least one other redundant node, then the incongruent nodes may each drop a same frame of processing, and revert to a previous state, to preserve congruency as opposed to halting a task. For example, suppose the redundant nodes were each redundantly processing frames of a video stream. If the redundant nodes are incongruent regarding the processing of one of the frames of the video stream, then the redundant nodes just can "agree" to drop processing of the one video frame, and to continue congruent processing with the next video frame. The dropping of one video frame here or there is typically less noticeable to a viewer than is including, in the video stream, an erroneously processed video frame.

Further problems associated with redundancy, and embodiments for congruency checking, are described below.

Still referring to FIG. 2, in safety-relevant systems, where the correctness of commanded-action or data reporting is often paramount, computations producing safety-related values are often replicated and their output compared to achieve a high degree of fault coverage. The replication and comparison strategy may be implemented by special computational hardware placed on a single board, such as the self-checking-pair hardware-host hardware discussed in the SAFEBus paper [1] (which is incorporated by reference), or, alternatively, it may be performed by tasks distributed across a network, such as the self-checking pair configuration on a braided ring (such as the braided ring of FIG. 1) [2] (which is incorporated by reference).

In the latter case where the replication is performed over a network, additional steps are performed to ensure that the replicated computational task set achieves and maintains the required degree of state congruency necessary to produce identical outputs. These additional steps include that the replicated tasks (or the nodes respectively performing these tasks) agree on initial state and on all input data that is causal to internal state changes/updates.

For non-high-integrity networks, where value correctness often cannot be guaranteed, the agreement process entails the retransmission and comparison of all values received by all consumers (e.g., other redundant nodes). Such exchanges can, therefore, constitute significant software and messaging overheads. For high-integrity networking technology, where value correctness often can be guaranteed to a reasonable degree of certainty, for technologies such as self-checking TT Ethernet, SAFEbus, or the BRAIN, the agreement-message-and-exchange overhead can be reduced to entail only the agreement of reception status, because with guaranteed value correctness, the only agreement that is required relates to inconsistently missing values.

But even with this reduction, if the agreement is to be performed in software, the associated real-time requirements associated with in-process exchanges may still constitute a significant software overhead. For this reason, in an embodiment, the agreement exchanges are implemented in hardware and use minimal software overhead. An embodiment presented herein includes such an ingress-agreement scheme and includes additional hardware configurations that may aid replicated-task-set performance.

As described above, an embodiment of the ingress-agreement scheme is depicted in FIG. 2. The scheme utilizes the determinism of time-triggered message exchange, although asynchronous variants are also possible. For each replicated task set, the network hardware maintains a list of VL IDs (input-data-message identifiers), which identify indicators corresponding to data in an input-data message, that require ingress agreement. This constitutes a monitored or agreement-message list 201 (there may be, for each node, multiple agreement-message lists, one for each process that the node is configured to perform on the same or on a different, set of input-data messages. Thus, in some implementations, multiple message-agreement lists can be assigned to a single ingress-agreement exchange VL. Each message-agreement list 201 is also assigned at least one dedicated Monitored VL ID 203 (message ID) to perform the ingress-agreement exchange. A message-agreement list 201 also contains an Exchange VL ID 202 (message-status buffer), which is used to compare the agreement of input-data messages between redundant nodes, as discussed above and as discussed in more detail below.

As data frames ("data frames" is another way to say "input-data messages") are received by a redundant node, they are checked against each of the agreed-upon lists of input-data-message identifiers. If the received input-data message is found on an agreed list of message identifiers, then the receiving host/node adds the reception status to the location of the exchanged VL message buffer corresponding to the received input-data message. Note, as additional input-data messages are received and matched to a respective message identifier in the list, the received status of these identifier-matched input-data messages is also written to the corresponding location(s) of the exchange buffer 202.

The precise organization of the buffer 202 can be implementation/application specific.

However, a simple mapping is shown in FIG. 3. In FIG. 3, a redundant comparison system 300 includes an Ingress Frame ID 301, which is sent to a redundant node 302. Redundant node 302 also receives an agreement-message list 303, which contains a set of Monitored VL ID corresponding to data in an input-data message. In this mapping, the index of the message ID in the VL list is used as an index into the assigned exchange VL buffer space. At the indexed location, the reception-status value (e.g., one or more bits) is written. For example, in response to receiving a input-data message having a matching message ID equal to n=0, the node 302 sets, to a logic 1 or other suitable value, the n=0 bit location of the message-status buffer 304.

If the replicated-system data flow is time-triggered, then, in accordance with the time-triggered schedule, the node 302 can determine that all ingress input-data messages have arrived for the task set. Following this point in time, the content of the message-status buffer (the exchange-buffer payload) is transmitted, and is routed such that it arrives at the other nodes replicating the associated task (e.g., the other half of a self-checking pair, on the adjacent node of a braided ring such as shown in FIG. 1).

Upon reception of the dedicated exchange message (contents of the message-status buffer 304), for each input-data message of the configured agreed list, the receiving node 302 compares the status of the remote reception with its local reception status. If both local and remote hosts indicate that the input-data message has been received OK, then the node 302 marks the associated input-data message with an agreed status in a status register (e.g., register 405 of FIG. 4). If either of the local or remote message-reception status (e.g., a value in a bit location corresponding to the input-data message) indicates that the input-data message was not received, then the input-data message is marked with a disagreed status in the status register. The agreed status is made available to all data consumers with a dedicated status bit maintained for each received-message ID buffer. This agreed status is then signaled as part of the fresh data indication to the host. Using this additional status, the host is able to identify which data has been received by each of the replicates. Note that the time-triggered schedule is also used to clear message status at a known point within the schedule to allow the frame processing to resume in the next cycle. In practice, this time triggering may be implemented at periodic schedule boundaries when rate-specific timelines restart or in conjunction with high-level buffer processing such as the maintenance of ping-pong buffer schemes, etc.

Referring to FIG. 4, the mechanism described in FIG. 4 enables software to identify, relatively simply, which input data was received on both parts of the replicated set (that is, which input data was received by all redundant nodes in the redundant set). In redundant comparison system 400, a populated Exchange VL ID (message-status-buffer contents) 401 is sent from one redundant node (not shown in FIG. 4) to a redundant node 402 for Agreement Frame Processing. At some period of time, usually determined via a time-triggered schedule discussed above, the redundant node 402 receives an agreement-message list 404, also containing an Exchange VL ID 403, which is the message-status buffer for the redundant node 402. Redundant node 402 then performs an agreement comparison check between populated VL ID 401 and the agreement-message list 404. After determining the extent of agreement between the agreement-message list 404 and the populated VL ID 401, redundant node 402 then populates an agreement register 405. Using this information, the mechanism can decide on which data to use for replica-determinate calculations, and, if necessary, substitute "safe-defaults" to mitigate missing input data. However, such decisions can also constitute a software overhead, since it entails separate reads and decision logic to be applied to each received data value.

Figure 5:
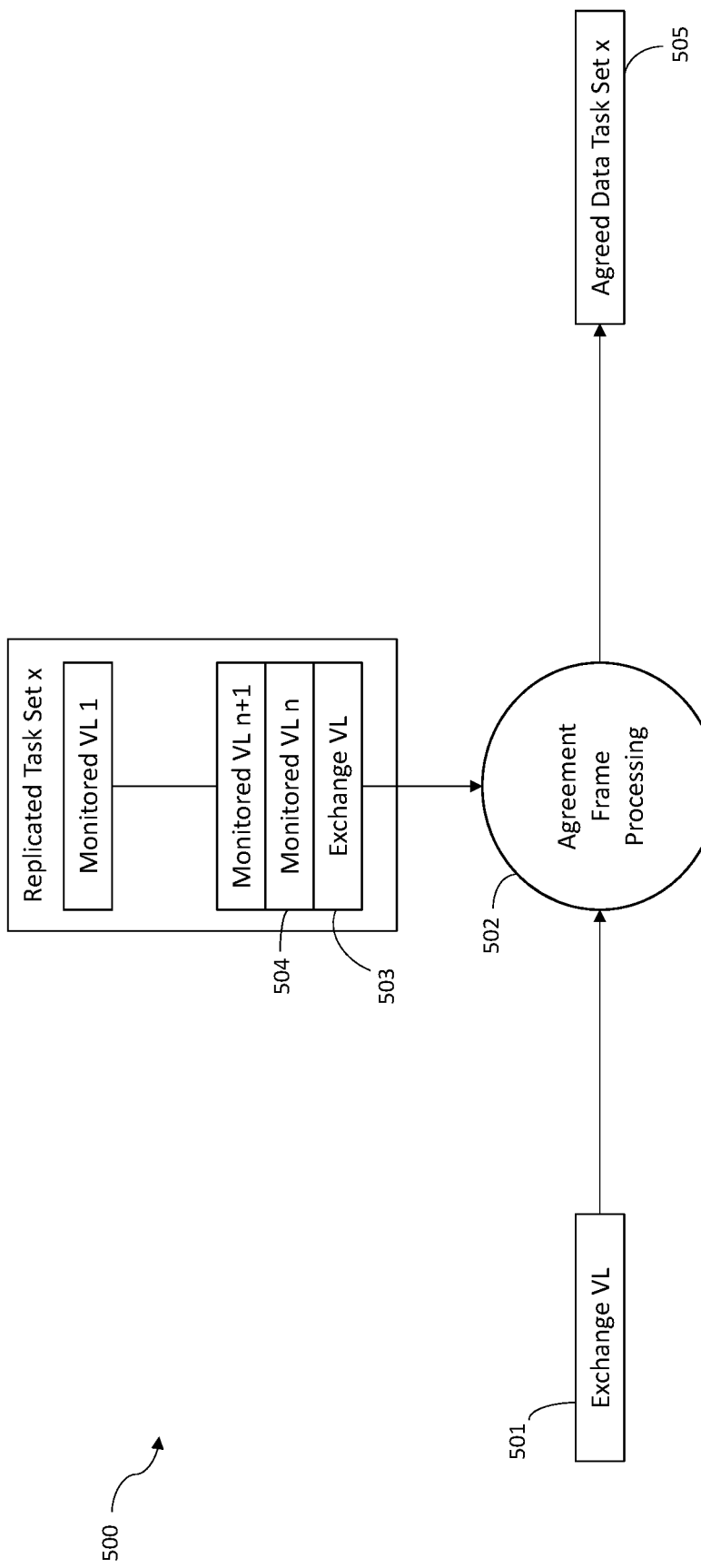
FIG. 5 is a diagram of a redundant node comparing its exchange message with the exchange message of at least one other redundant node and populating a respective agreement-message in response to the comparison, according to an embodiment.

The mechanism described in FIG. 5 is similar to that described in conjunction with FIG. 4, but illustrates a situation in which a comparison of the message statuses (e.g., Exchange VLs 501 and 503) indicates that the redundant nodes have each received only some, but not all, of the input-data messages needed for a task. The ingress-agreement logic 502 can include an agreement threshold to determine replicated-task-set-data validity, where a threshold number of redundant input-data messages must be marked as agreed in order for the redundant nodes to proceed with the task. The threshold number can be equal to or less than the total number of VLs in the input-data message set. For example, if four VLs compose a replicated task set in an agreed message list, an agreement threshold set to three would allow the data to be presented to the host as fresh if three of the four VLs are marked with an agreed status. Host access to the data payload of the input-data messages can also be implemented to move only one agreed copy to the host via a generic request to retrieve the data for the replicated task set, thereby reducing host processing needs. For example, suppose first and second redundant nodes have an agreement threshold of three input-data messages, and independently determine, by comparison of their status messages 501 and 503, that each of the nodes has received only three out five data-input messages. Because the number of input-data messages received by each of the first and second redundant nodes is equal to the threshold, the first node generates an agreed-data message 505, which indicates the three data-input messages that both the first and second redundant nodes have received. The first node then sends the agreed-data message 505 to the second node, and the first and second nodes each perform the task as may be modified to accommodate the reception of only three of the five expected input-data messages. Although the second redundant node generates an agreed-data message that, unless there is an error, is the same as the agreed-data message 505, the second redundant node does not send the agreed-data message to the first redundant node to avoid unnecessary data traffic. But if the second redundant node determines that the agreed-data message that it generated is not the same as the agreed-data message 505 from the first redundant node, then the second redundant node can notify the first redundant node of the error, and both nodes can proceed according to an error-handling routine.

Figure 6:
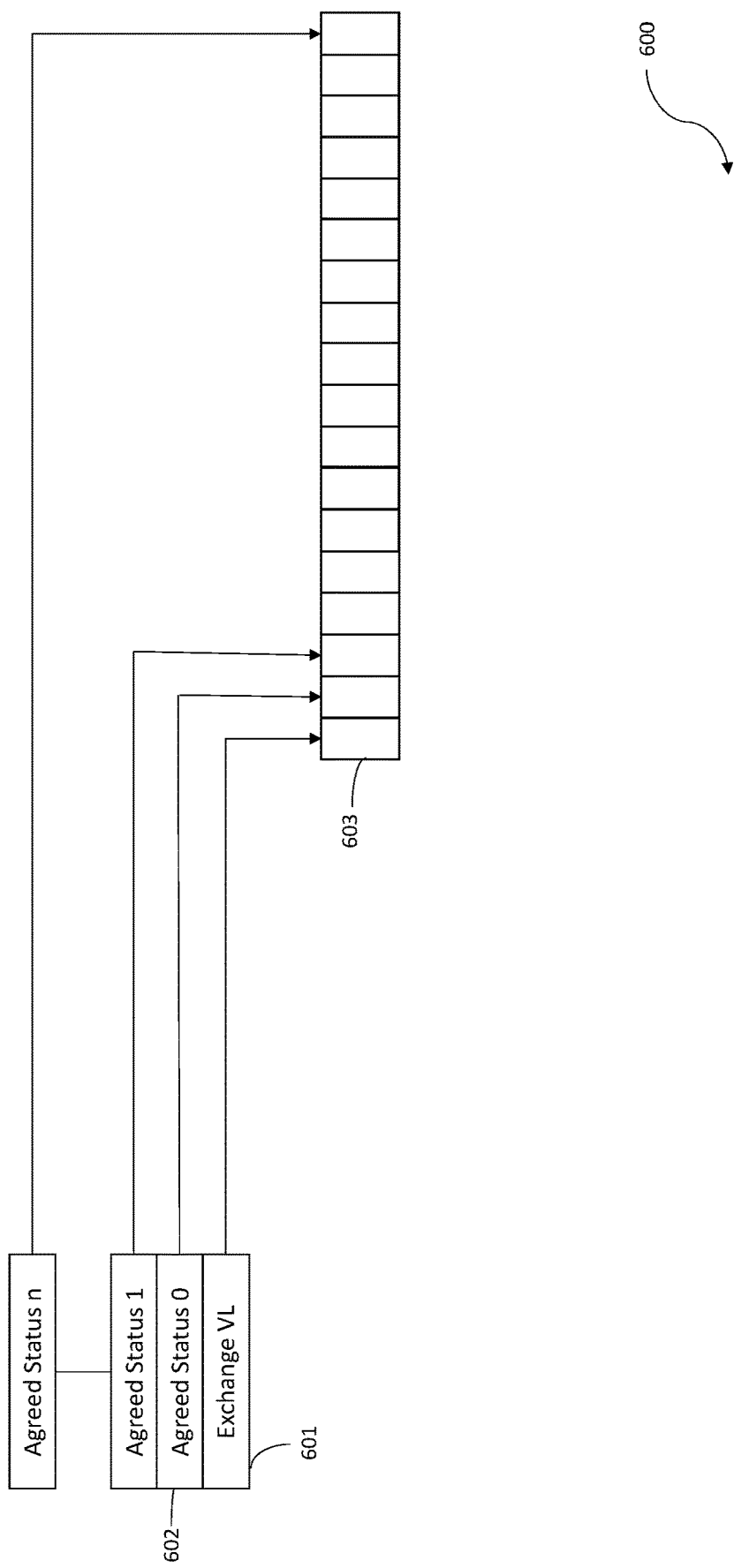
FIG. 6 is a diagram of populating an agreement register to create an agreed-data summary string, according to an embodiment.

The buffer status is efficiently summarized at the host interface as depicted in FIG. 6.

Diagram 600 shows a populated agreement register 602 with a corresponding Exchange VL ID 601 that is summarized to create an agreement string 603. Each bit in the agreement string 603 corresponds to an agreement comparison state populated by the agreement register 602. Such results may be summarized in a digital logic fashion, for example, each bit representing a logical 1 or 0 depending on the agreement state between the comparing nodes. This is a single contiguous encoding for the summary status. For example, bit location zero (left-most bit position) corresponds to the redundant pair of redundant node 0 and redundant node 1. A logic 1 in this bit location indicates total agreement in input-data messages, initial conditions, and data-processing sequence, and a logic 0 indicates at least one disagreement. Similarly, bit location one of the string 603 corresponds to the redundant pair of redundant node 0 and redundant node 2, and so on.

In summary, for each of the replicated tasks, a summary of the agreed state is presented in a packed set of a data word or data words. Using this summary information, it is possible for the replicated tasks to implement some of this default-value-selection logic as a table look-up operation. That is, depending on what values are valid, the software may branch efficiently to alternative programmed logic that are mapped to the available data. For example, if there is disagreement between redundant node 0 and redundant node 2, then the software running on nodes 0 and 2 may execute in such as way as to make the results generated by the redundant nodes 0 and 2 independent of the items (e.g., input-data messages, initial conditions, operating-sequence step) that disagree.

In IMA Systems, an active/shadow replication function is often utilized to improve system performance. For example, in the AIMS of the Boeing 777 jetliner, active and shadow nodes share SAFEbus messaging slots to conserve network bandwidth. In such configurations, the mechanisms presented herein may be extended to improve the buffer allocation associated with active shadow configurations. Nodes receiving messages from active/shadow pairs may use a shared buffer model, where both active and shadows message receptions write into a common buffer space. In such cases, the buffer agreement word would be a function of the OR of the active/shadow message receptions. Should the active and shadow message receptions be temporally separated, the second reception may simply overwrite the 1st reception. In such a case, comparison of the exchange words is scheduled to occur following the last scheduled transmission.

Other mechanisms can be present to ensure that the outputs of active and shadow components are replica determinate and are bit-for-bit identical. The exchange mechanism presented here is, is part of, or includes an embodiment of an agreement mechanism.

In some applications it may be permissible to drop a frame of processing where reverting to a previous frame's state vector may be preferable to loosing congruency between replicate task sets. For this reason, the exchange mechanism may be extended to include the data selected from the task, for example, the result of the previous comparison steps, as described above. This may be included in the above exchange messages (for example, by adding a previous frame's status field), or by introducing additional exchange messages. A frame counter may also be included to ensure consistency of the signaling.

Each half of the redundant pair or nodes can then compare the partner's used reception status with the local used reception status. On detecting a difference, each half may revert to a previous agreed state, for example, the previous frame or a safe-configured mode-specific default-state vector (for example, the drop-video-frame example described above).

This mechanism may, therefore, mitigate the scenario when one of the exchange input-data messages is "lost."

Figure 7:
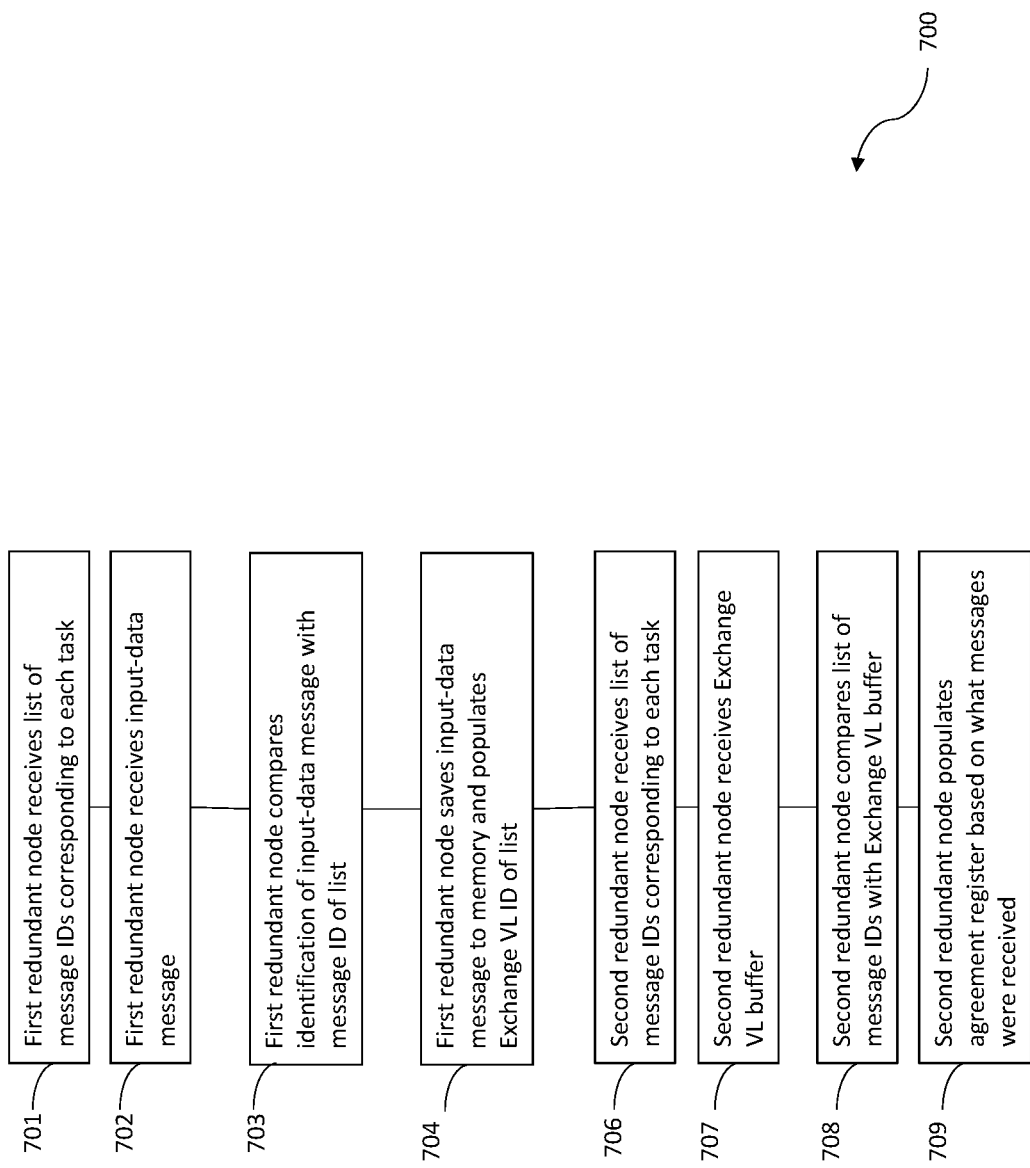
FIG. 7 is a flow chart of a process for conducting an ingress-congruency check among redundant nodes, according to an embodiment.

FIG. 7 is a flow chart 700 that describes a process of performing an ingress-congruency agreement check, according to an embodiment.

The process begins at a step 701, where a first redundant node receives a list of input-data message IDs that correspond to a given task.

At a step 702, the first redundant node then receives an input-data message.

At a step 703, the first redundant node compares identification data of an input-data message with a message ID in the list of message IDs received.

Then, at a step 704, the first redundant node populates a corresponding location of an Exchange VL ID (message-status buffer) based on the results of the agreement comparison. The first redundant node may also save the input-data message to a memory storage device for further processing.

Beginning at a step 706, a second redundant node receives a list of message IDs, and at a step 707, the second redundant node also receives an Exchange VL ID buffer (message-status buffer).

At a step 608, the second redundant node compares its list of message IDs with the Exchange VL ID buffer.

At a step 709, the second redundant node then populates an agreement register based on what messages were received.

In summary, features of an embodiment of the ingress-congruency (agreement) check include:

1) Exchanging status messages among redundant nodes instead of exchanging input-data messages, initial conditions, and other information reduces the bandwidth of the network commandeered by the redundant nodes and, therefore, increases the processing throughput of the nodes and the available bandwidth of the network.
2) The input-data-message list can be stored in a look-up table (LUT) at, or in association with, a redundant node, where the look-up table entries (e.g., input-data message identifiers) can be accessed/addressed by an identifier associated with a received input-data message to reduce processing throughput of the redundant node. For example, if the identifier associated with the received input-data message corresponds to an identifier in the LUT, then a positive match is determined between the received input-data message to an input-data message on the list; conversely, if no identifier associated with a received input-data message corresponds to an identifier in the LUT, then it is determined that the redundant node has not received the listed input-data message corresponding to the unmatched identifier.

Redundancy Validity Check

The above-described embodiments of ingress-congruity check effectively occur on the input side of a redundant task, to insure that the redundant nodes perform the same operations starting at the same initial conditions with the same input data. If this occurs, then, barring an error, the redundant nodes should generate the same result.

Unfortunately, even where ingress-congruency exists among redundant nodes, there may be sources of error that cause the redundant nodes to generate different results. For example, there may be a hardware defect or other failure in one or more of the nodes, or there may be a data "glitch," for example, caused by radiation or electromagnetic interference, that causes an error in the result generated by a redundant node.

Therefore, a redundant system can implement redundant validity check of the results generated by grouped redundant nodes to determine if any such errors occurred and resulted in at least one of the redundant nodes generating an erroneous result.

In an embodiment, it is assumed that if all redundant nodes generate a same result, that the result is correct and is, therefore, valid.

Alternatively, if at least one redundant node generates a result that is different from the result generated by at least one other redundant node, it is assumed that at least one of the results is erroneous, and, therefore, that all of the results are invalid.

As described below, the system is configured to indicate to other, downstream, nodes that use the result in their operations or calculations whether the result is valid or invalid so that other nodes "know" whether to use, or "ignore," the result.

Figure 8:
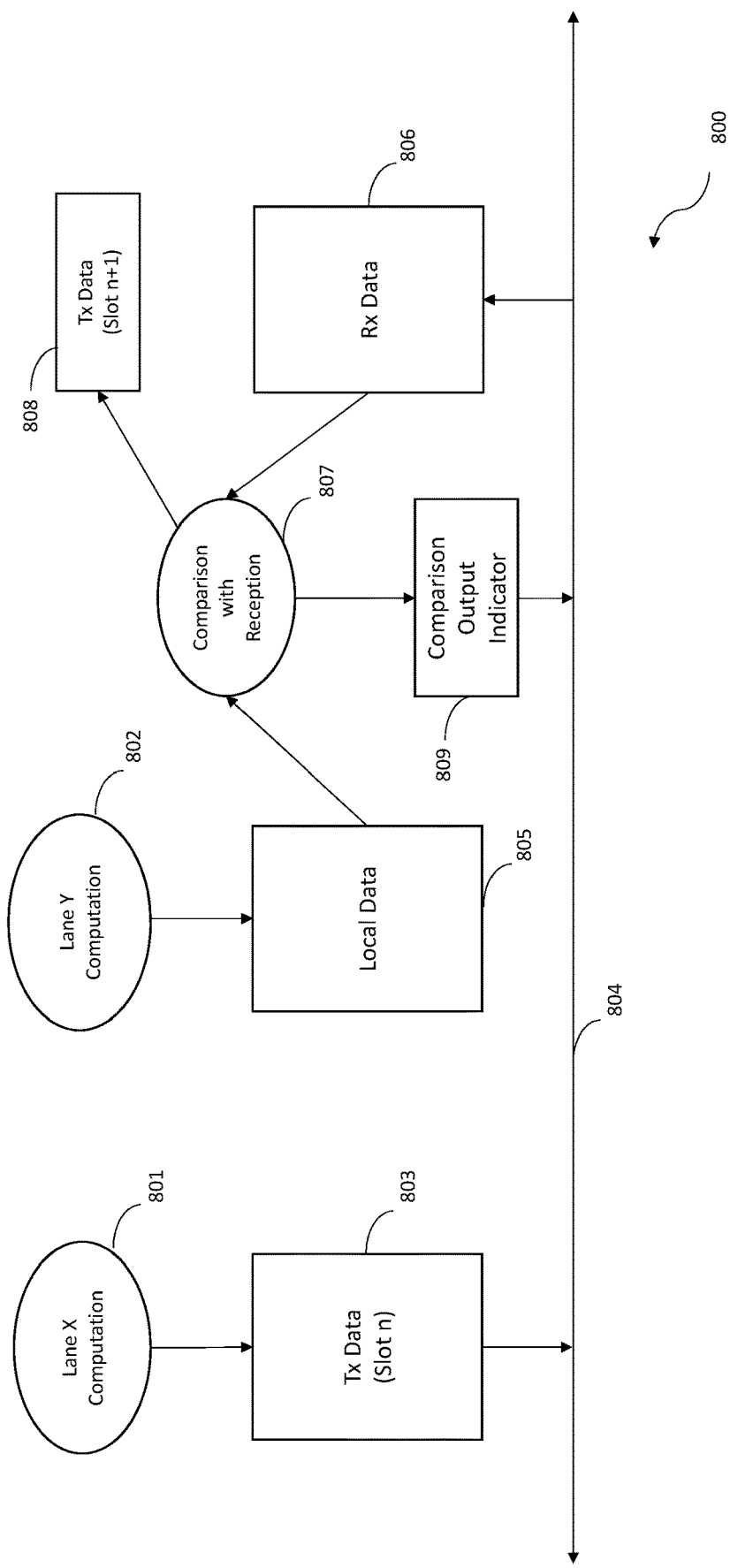
FIG. 8 is a diagram of two redundant nodes and circuitry configured to perform a redundancy-validity check between the results generated by two redundant nodes, according to an embodiment.

Referring to FIG. 8, a first N-bit message resulting from a Lane Y computation 802 performed by a first redundant node is stored, in whole or in part. Simultaneously or subsequently, a second N-bit message resulting from a Lane X computation 801 performed by a second redundant node is transmitted on a bus 804 where, if no fault occurs, the first message, or a portion thereof (e.g., a payload), equals the second message, or a corresponding portion thereof (e.g., a payload), on a bit-by-bit basis (for purposes of example, it is assumed that the bus 804 is a serial bus, although it is understood that the principles described herein are applicable, and can work with, or be modified to work with, a parallel bus having multiple bits). The second message is received from the bus 804, and a comparison circuit 807 performs a bit-by-bit (or portion-by-portion) comparison of the first and second messages in real time, "on the fly," as the comparison circuit receives the second message on the bus. That is, the second message need not be buffered in a memory, but each bit of the second message is compared with a corresponding bit of the first message as the bit of the second message occupies the bus 804. This "on-the-fly" comparison eliminates the overhead and delay/latency associated with buffering the second message.

If the result of the bit-by-bit comparison is that the first message equals the second message, then the comparison output indicator circuit 809, or an associated circuit, generates an indication to the other nodes in the system (e.g., other nodes coupled to the bus 804 and that are, or may be, consumers of the result generated by the redundant nodes 801 and 802) that the second message on the bus is valid, where the indication is smaller (e.g., fewer bits) and takes less time to generate (e.g., fewer clock periods) than repeating the second message on the bus. For example, the output indicator circuit 809, or an associated circuit, generates an ACK flag of one or more bits on the bus 804 so that other nodes on the network "know" that the second message on the bus, and immediately preceding the ACK flag, is valid. Alternatively, if the result of the comparison indicates that the second message is not valid, then the circuit 809, or an associated circuit, generates an indication to the other nodes in the system that the second message on the bus 804 is not valid, that is, invalid. For example, the indicator circuit 809, or an associated circuit, may truncate the second message (the other nodes can be configured to recognize that a message of fewer than a particular number of bits is invalid) as soon as a bit inequality between the first and second messages is found, or may generate a NACK flag or any other appropriate indication that the second message is invalid. Advantages of such an embodiment include that little or no processing overhead is used, messages are transmitted with little or no delay because the second message is driven onto the bus without delay, and, but for the possible addition of an ACK flag or a NACK flag, the available bus bandwidth is not reduced.

Still referring to FIG. 8, other embodiments are contemplated. For example, the absence of a flag, such as an ACK flag, can indicate that the message is valid. Because, in most networks, an invalid message is less frequent than a valid message, the use of a NACK flag and no ACK flag causes even less of a reduction in the available bus bandwidth. Furthermore, although the message-transmission medium is described as being the serial bus 804, the message-transmission medium may be another other suitable type of transmission medium such as a parallel bus.

Figure 10:
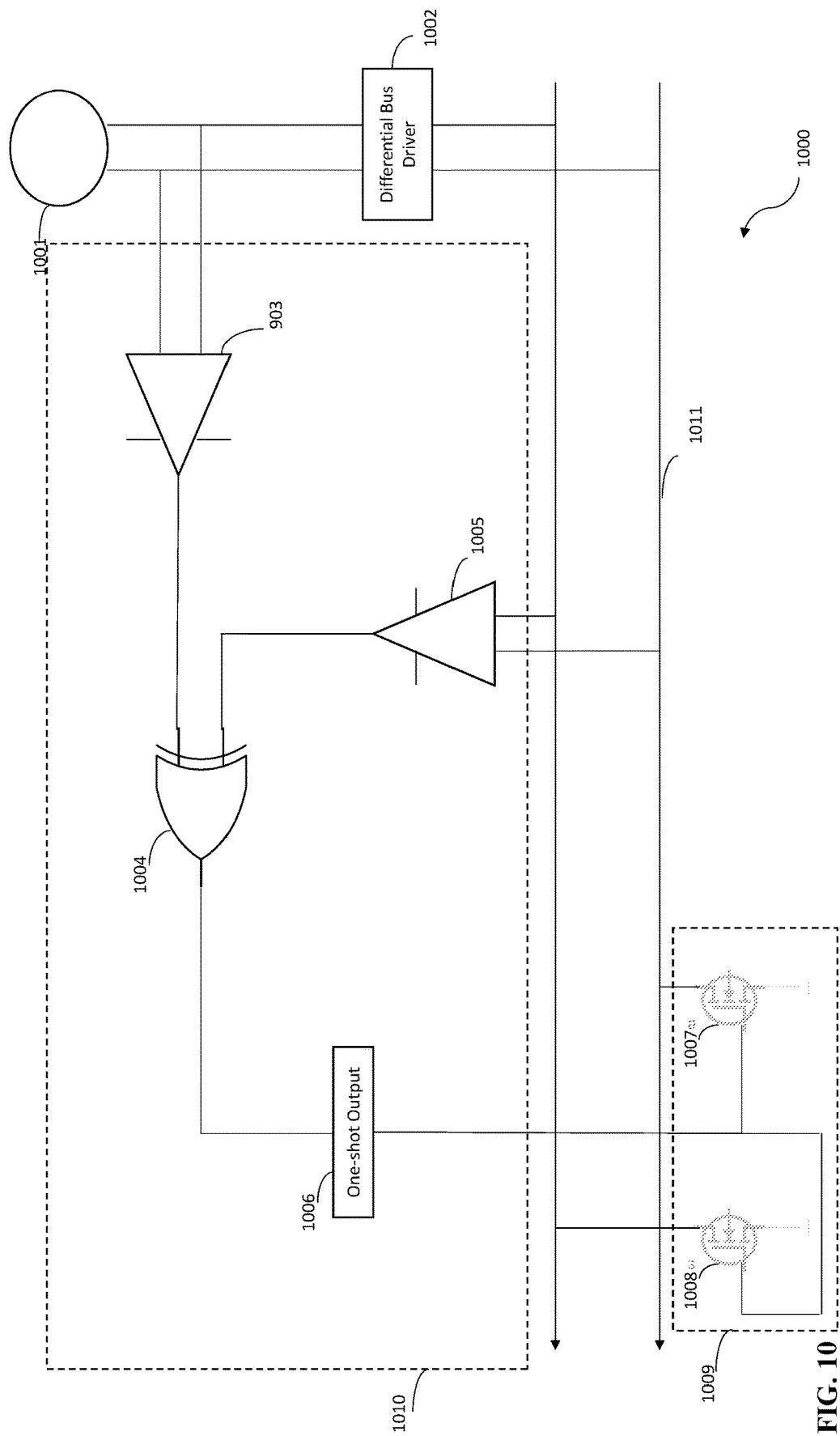
FIG. 10 is a diagram of the circuitry of FIG. 7 configured to perform a redundancy-validity check, according to an embodiment.

Referring to FIG. 10, another embodiment of an improved redundant system and method "offloads" the above-described redundancy-validity check to dedicated, non-instruction-executing (e.g., hardwired or hard-configured) hardware/circuitry that performs the validity check "on the fly" on a bit-by-bit basis (or otherwise on a portion-by-portion basis) so that there is no consumption of processing throughput by, and, therefore, so that there is no increase in processing overhead of, any node. Accordingly, there is little to no latency or delay added to the data-message flow. If the result of the validity check is that the result is valid (the result from one redundant node equals the result(s) for all other redundant node(s)), then a result-valid indication is made. For example, as described above, a flag may be set to indicate validity, or no flag is set, and no alteration of the result that is propagating along the bus/network is made, to indicate validity.

Figure 9:
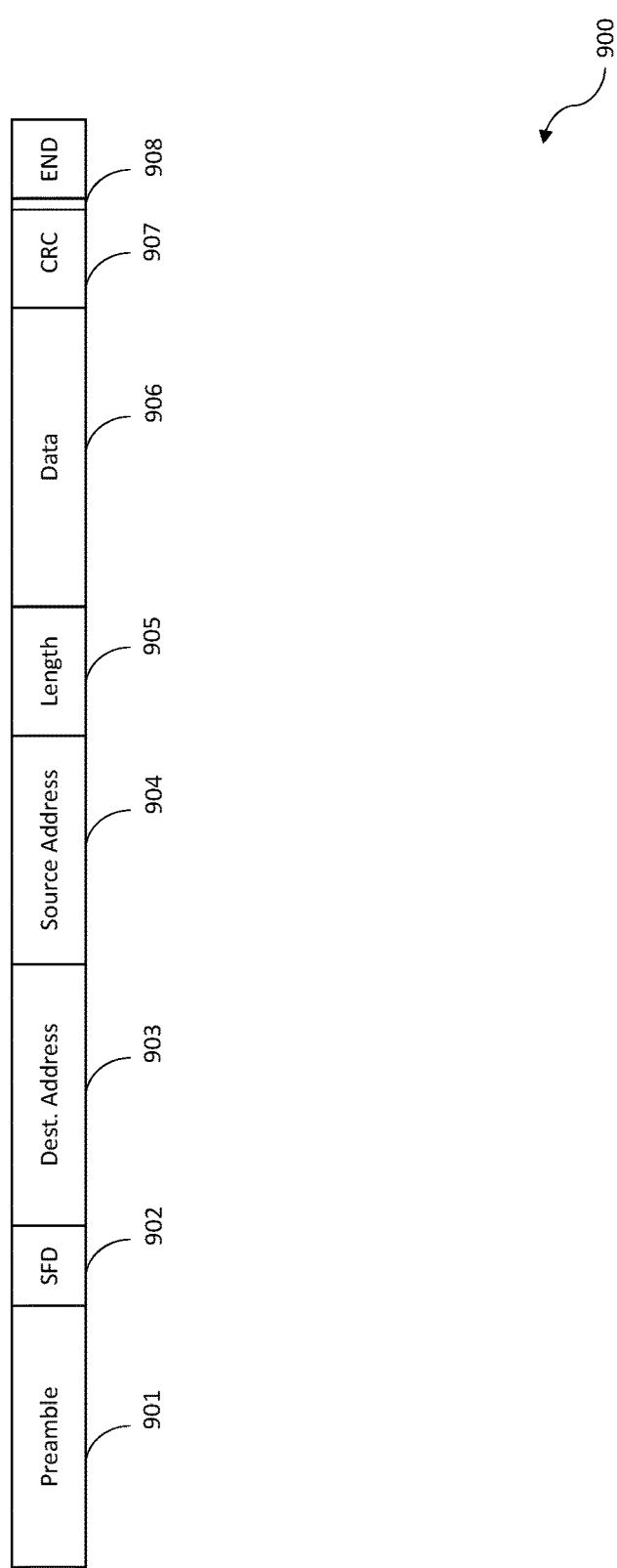
FIG. 9 is a diagram of an input-data message, according to an embodiment.

If the result of the validity check is that the result is invalid, then a result-invalid indication is made so that other nodes in the network will "know" the result is invalid so that they do not use the invalid result in their respective calculations. For example, this indication complies with the underlying communication standard of the system such that the result-invalid indication is interpreted as "invalid message" by unmodified standard network interfaces. An example of a message 900 is shown in FIG. 9. The message 900 includes a Preamble 901, SFD 902, Destination Address 903, Source Address 904, Length 905, Data 906, a CRC 907, and END message 908. Referring to FIG. 9, most communication standards end their messages with an error checking sequence 907 (such as a CRC) or an end-of-message marker; a suitable indication for an invalid message is to truncate the message (for example, at a location shown at 908 of FIG. 9) such that any end-of-message marker is prevented from being propagated, or that any error-checking algorithm performed at the receiving nodes yields an unrecoverable error. Some communication standards include the length of each message in a header for that message; again, truncating the message so that it is shorter than what is advertised in the header would be a suitable indication for an invalid message.

FIG. 10 is an example of the redundant-validity-check procedure or mechanism, and circuitry for implementing the procedure, for a system in which the nodes are connected by a standard bus, such as the Controller Area Network (CAN) serial twisted-pair differentially-signaled bus developed for the automotive industry, according to an embodiment. For example, the circuitry 1010 of FIG. 10 can form the comparison circuit 807 of FIG. 8, and the circuitry 1009 can form the comparison-output indicator circuit 809 of FIG. 8. FIG. 10 shows the circuitry for only a one-bit-wide bus (CAN bus is a single-bit-at-a-time serial bus), it being understood that for a multi-bit parallel bus, the circuitry can be replicated for each bit, and may be modified as needed, for example, to OR the outputs of all the XOR gates to generate an invalid-indicator flag. It is also understood that this disclosure is not limited to a differentially-signaled bus as shown in FIG. 10; this disclosure is also applicable to non-differential (single-ended) signals and to topologies other than a bus (e.g., ring topology, star topology, or a braided network such as shown in FIG. 1).

Circuit 1010 includes an exemplary embodiment of the input-data-message comparison circuit 807 described above in conjunction with FIG. 8. A first redundant node (shown as Lane X in FIG. 8, but not shown in FIG. 10) transmits a bit of a result on the portion of the message bus 1011 (the portion of the bus also may be the entire bus). While the bit of the result from the first redundant node is on the portion of the bus 1011, a second redundant node 1001 outputs the same bit position of its result of a same or similar operation. The bus driver 1002 is inactive so that the result from the second redundant node does not create a conflict on the bus. Furthermore, if needed, conventional synchronization circuitry/techniques can be used to make sure that the second redundant node 1001 outputs its result at the same time as the result from the first redundant node is on the bus. For example, the synchronization can be exact (bit-for-bit aligned) or can be approximate where the bits aren't exactly aligned but where conventional de-skewing circuitry aligns the bits in time within the comparison circuitry.

A first receiver (e.g., a sense amplifier) 1005 generates a value for the bit on the portion of the bus 1011 (the bit being from the first redundant node), and a second receiver (e.g., a sense amplifier) 1003 generates a value for the corresponding bit of the result generated by the second redundant node 1001. An XOR gate 1004 compares the two values from the receivers 1005 and 1003. If the two values are equal, then the XOR gate 904 outputs a logic 0; but if the two values are not equal, which indicates that at least one of the results is invalid, and, therefore, that the result from the first redundant node is assumed to be invalid, the XOR gate outputs a logic 1.

In response to a logic 0 output by the XOR gate 1004, a one-shot circuit 1006 maintains a logic 0 on its output. Also in response to the logic 0 from the one shot 1006, two N-channel MOS transistors 1007 and 1008 remain inactive, and so the determined-to-be-valid result that the first redundant node is driving onto the portion of the bus 1011 is allowed to propagate along the bus to other nodes in the network.

But in response to a logic 1 from the XOR gate 1004, the one shot 1006 outputs a logic 1 for a period of time that lasts for one to several clock cycles of the bus, where the number of cycles is specific to the protocol format being used on the portion of the bus 1011 and the number is chosen such that one-shot signal duration is sufficiently long, as described below. In response to the logic 1 from the one shot 1006, the two transistors 1007 and 1008 are activated, and pull down, to ground (logic 0), both lines of the portion of the bus 1011. Since this state of the bus (both differential lines pulled to the same state) is an unallowed state (a valid bit requires one of the lines to be logic 1 high and the other to be logic low 0), this purposely imposed unallowed state acts an indication to all nodes on the network that the current message from the first redundant node is invalid.

Actually, the bits of the current message cannot propagate on the bus 1011 during the time that the one-shot output is a logic 1, because both differential lines of the bus are pulled logic low 0, but the logic low 0 on both lines of the bus during a time that nodes connected to the bus "expect" a data result on the bus indicates to the nodes that no valid result will be present on the bus during that particular data time. For the protocol format used by any particular network to which a technique disclosed herein is applied, the duration of the one-shot logic 1 is selected to ensure that the current message from the first redundant node is seen as invalid by the other nodes in the system. The duration is also selected to not "bleed over" to affect a subsequent message. Other minor variations of this embodiment include (1) having the two transistors 1007 and 1008 couple the signal lines of the bus to a power source instead of to ground, (2) shorting the two signal lines of the bus together, and (3) using diodes instead of transistors (see U.S. Pat. No. 8,249,448, which is incorporated herein by reference).

There are other ways to indicate that the message from the first redundant node is invalid. For example, non-instruction-executing circuitry can append a flag bit (e.g., a NACK flag as described above) to the end of the message, or can generate a subsequent message on the bus, the sole purpose of which is to indicate that the message (or the immediately previous message) is valid or invalid (alternatively, the flag or subsequent message may not even be generated if the redundant message is valid; another alternative is to generate this flag or subsequent message for valid messages and not generate it for invalid messages).

For network protocols in which messages have a known length or need to be an integer multiple of some basic unit larger than one bit (e.g., a byte or a "character"), non-instruction-executing circuitry can "cut off," or truncate, the rest of an invalid message, after an error (i.e., bit inequality) is detected; this makes the message's lack of validity manifest by being shorter than the protocol expects or by not being an integer multiple of its basic unit. Some networks, like Ethernet 10BASE-T, have an idle "gap" period between messages, where the gap period is a period of bus inactivity in which no data is driven onto the bus (e.g., the bus is tri-stated or both lines of a differentially driven bus are pulled to a same value as described above). For such networks, a truncation indicating invalidity causes the "gap" to start prematurely, and nodes on the network would interpret this prematurely starting gap as an indication that the message on the bus just prior to the gap is invalid. Some networks, like Ethernet 1000BASE-T, fill the time between messages with one or more "idle characters", which form a bit sequence that indicates that the bus is idle and that no data is currently being driven onto the bus by any node. For such networks, non-instruction-executing circuitry can "cut off" the rest of the invalid message, after an error is detected, by inserting one or more "idle characters" prematurely, and nodes on the network would interpret this premature one or more "idle characters" as an indicating that the message on the bus just prior to the "idle characters" is invalid. Some networks that require messages to be an integer multiple of some basic unit larger than one bit include "out of band" characters that are used only for protocol purposes and cannot be mistaken for data (e.g., *8B/10B encoding). For such networks, lack of validity can be indicated by inserting a premature end-of-message "out-of-band" character or an error "out-of-band" character. In yet another embodiment, to save the bandwidth and the memory that would otherwise be needed to buffer the redundant message generated by the redundant node 1001, the node 1001 can generate the redundant message "just in time" as the other redundant message on the bus 1011 is "passing by" or "flying by."

In summary, hardwired/configured circuitry does an "on-the-fly," bit-by-bit, (or portion-by-portion if each portion is longer than one bit) comparison between a message that a first redundant node broadcasts on a bus, or other message transport, and a redundant message from a second redundant node synced to the first redundant node, and generates some type of indicator if the messages do not match, where the other nodes in the network interpret the indicator to mean that the message is invalid (alternatively, the indicator can mean, and be interpreted as, the message is valid). Advantages of such hardwired/configured circuitry include that (1) no node-processing overhead is consumed for the validity test, (2) the first redundant node's driving of the redundant message onto the bus/transport is not delayed, and (3) no bus/transport cycles need be added to accommodate the invalidity indication, unless a flag bit is added, or a subsequent small invalidity message is generated and transmitted.

The above-described embodiments can be modified for use in types of networks and according to types of network protocols other than a CAN bus network and protocol. Furthermore, components, operations, or alternatives described for one of the embodiments may be applicable to another of the embodiments. For example, the comparison circuitry described in conjunction with FIG. 10 may be useful as the comparison circuitry described above in conjunction with FIG. 8. Furthermore, the circuitry of FIG. 8 can, for example, truncate the message resulting from the Lane Y computation to indicate that the message is invalid instead of generating a NACK bit on the bus.

Referring again to FIG. 8, in yet another embodiment, there are two distinguished nodes:

a) redundant node 801 referenced as "transmitter," "master," or "source;" and b) redundant node 802 referenced as "checker" or "verifier."

If a broadcast or a multicast message from node 801 follows two independent paths to arrive at node 802 in, for example, a Honeywell braided ring (FIG. 1) (or other) network, and the node 802 determines that the messages on the two paths are valid (the node 802 can determine validity or invalidity with the bit-by-bit comparison technique described above), then the node 802 can send a separate message to all other nodes attesting to the validity of that message from the node 801. Each other node then "knows" that it received a valid message from the node 801 without need of further checking. The assignments of which nodes in a network are so distinguished can change on a message-by-message basis or on some other assignment-changing basis.

Figure 11:
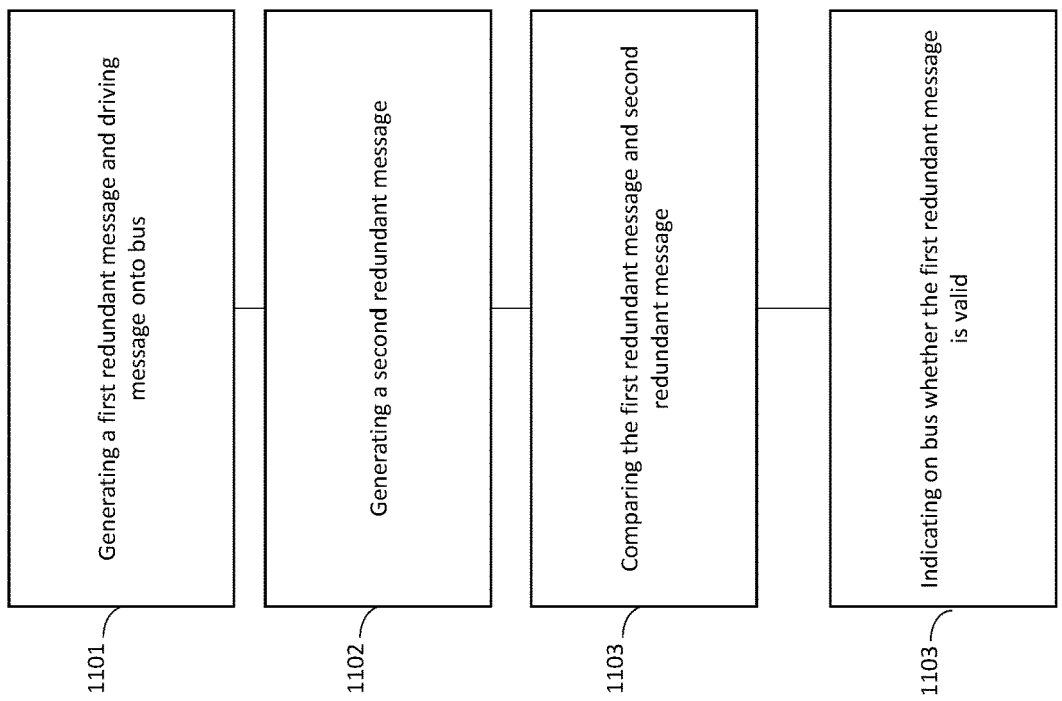
FIG. 11 is a flow chart of a process to perform a redundancy-validity check of results generated by two or more redundant nodes, according to an embodiment.

FIG. 11 is a flow chart 1100, which illustrates a process for performing a redundancy-validity check of results generated by multiple redundant nodes, such as the nodes 801 and 802 of FIG. 8.

At a step 1101, a first node generates a first redundant message and drives the first redundant message onto a network bus.

Next, at a step 1102, a second node generates a second redundant message.

Then at a step 1103, circuitry, such as the comparison circuitry 807 of FIG. 8, compares the first and second redundant messages, for example, on a section-by-section, or on a bit-by-bit, basis.

Next, at a step 1104, circuitry, such as the comparison output indicator circuit 809 of FIG. 8, indicates whether the one of the first and second messages propagating on the bus is valid or invalid. For example, the circuitry can generate a flag indicating message validity or invalidity, can truncate the message to indicate invalidity, or can do nothing to indicate validity.

Figure 12:
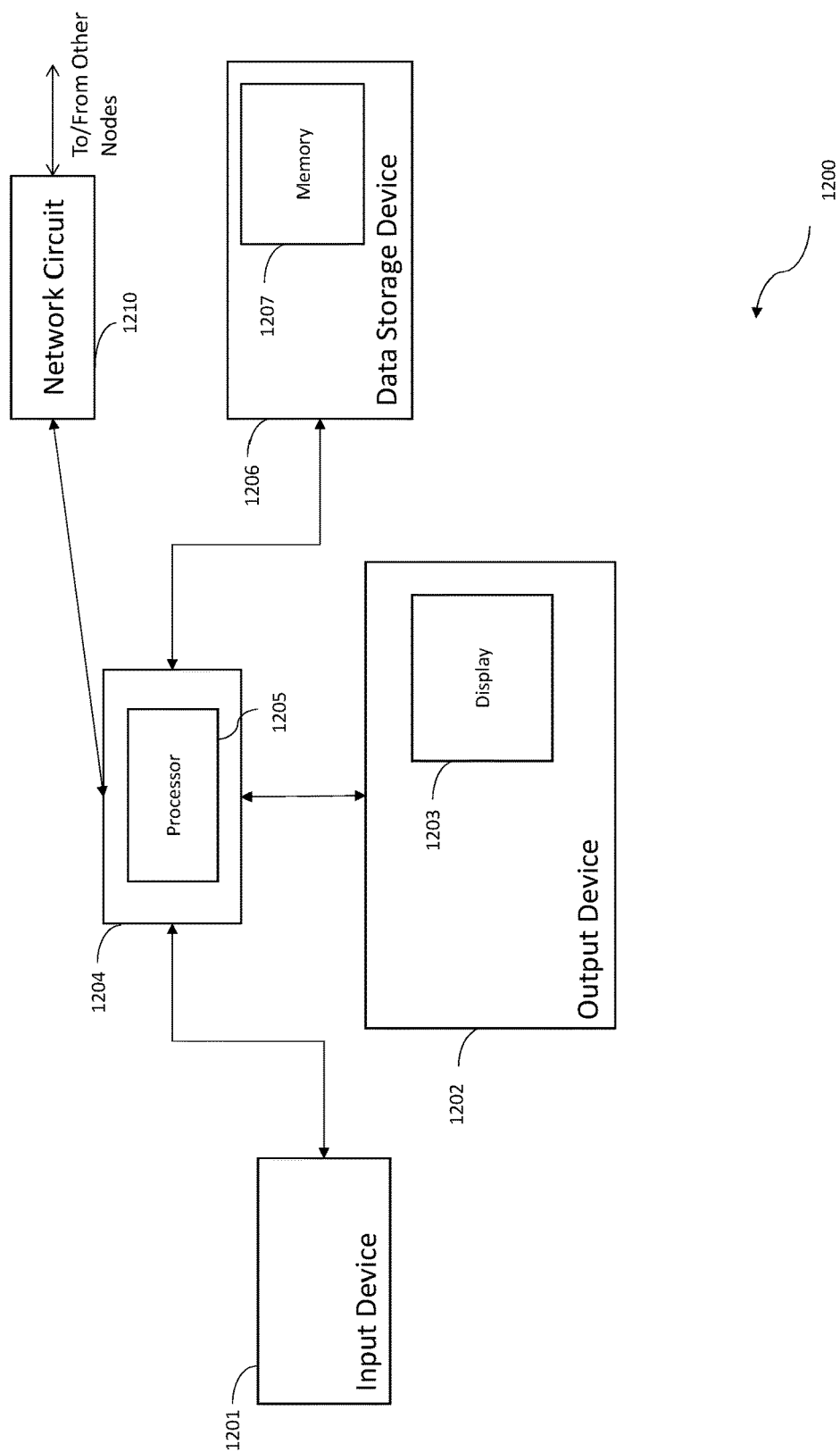
FIG. 12 is a diagram of an electronic system that includes one or more redundant nodes, or that forms one or more redundant nodes, according to an embodiment.

FIG. 12 is a diagram of a redundant node 1200, which may be the same as, or similar to, the redundant node 102-2 of FIG. 1 or the redundant node 801 of FIG. 8, according to an embodiment. Furthermore, the diagram may also represent a non-redundant source or destination node of a system.

The redundant node 1200 includes computing circuit 1204, which includes a processor 1205 such as, for example, a microprocessor or microcontroller.

The computing circuit 1204 is coupled to an input device 1201, an output device 1202, and a data-storage device 1206. The input device 1201 is configured to provide data to the computing circuitry 1204, and may be, or may include, for example, a keyboard, keypad, voice-command circuit, or a sensor. For example, the computing circuit 1204 can be, can include, or otherwise can perform the functions and operations attributed to the comparison circuit 807 and the indicator circuit 809 as described above in conjunction with FIG. 8. Further in example, the computing circuit 1204 can include a field programmable gate array (FPGA) or an application specific integrated circuit (ASIC) on which is instantiated the circuits 807 and 809.

The computing circuit 1204 is configured to provide data to the output device 1202, which may be, or which may include, a display screen 1203, a printer, or an audio speaker.

The data storage device 1206, which may be, or which may include, a memory 1207 such as RAM, ROM, EPROM, EEPROM, a flash drive, a disk drive, or an optical drive is configured to store data written by the computing circuit 1204 and to provide, to the computing circuit, data read by the computing circuit.

And a network circuit 1210 is configured to allow the computing circuit 1204 of the node 1200 to communicate with other nodes in the network, for example, over a wired connection (e.g., an Ethernet cable) or a wireless connection (e.g., WiFi®, Bluetooth®).

General network definitions as used herein and in the relevant art are: bus network—message from a source node can propagate directly to a destination node without going through any other node; ring network—message from source node must propagate through all nodes between the source node and the destination node to get to the destination node; mesh network—message from source node must propagate through at least one, but need not propagate through all, nodes between the source and destination nodes; and star network—message from source node must propagate through exactly one node between the source and destination nodes (a major subset of mesh, often talked about separately).

It is noted that a message marked as invalid may not be invalid (a "false positive" indication of error), and that a message marked as valid may not be valid (a "false negative" indication of error). For example, if a first redundant node correctly generates a message, but a second redundant node generates an erroneous redundant message, then the circuitry (e.g., the circuitry 809 of FIG. 8) still flags the message from the first redundant node, which is the message on the bus/transport, as invalid because the circuitry does not "know" whether one or the other redundant message is valid. And there is a possibility that both redundant messages could be erroneous yet equal, in which case the circuitry (e.g., the circuitry 809 of FIG. 8) interprets the erroneous message on the bus as being valid. Another source of false positives and false negatives is within the checking circuitry (e.g., the circuitry 807 of FIG. 8 and circuitry 1010 of FIG. 10) itself. For example, the XOR gate 1004 could have a fault such that its output is stuck at either 0 or 1, with the former likely generating false negatives and the latter likely generating false positives (or killing the bus 1011 completely).

Fault-tolerance techniques seek to provide two characteristics-availability and integrity (either singly or jointly). Availability is the characteristic that a system continues to work but might be erroneous. Integrity is the characteristic that the system always does the right thing or nothing. False-positive indications per this disclosure adversely affect availability but not integrity. False-negative indications per this disclosure could adversely affect integrity but not availability. To achieve a desirable level of availability and/or integrity, a system typically includes a level of redundancy sufficient to overcome given probabilities of component failures leading to "false positive" or "false negative" cases.

Further embodiments include methods for achieving better availability and/or integrity, and "scrubbing" to detect failures within the checking circuitry.

Features of an embodiment of the redundancy-validity check include:

1) The comparison can be bit-by-bit (or portion-by-portion) as one of the messages is propagating on the bus/transport and as the other of the messages is being generated "just in time." That is, there is no need to buffer/register the messages so that the register contents can be compared bit-by-bit. Therefore, the delay/latency and processing overhead inherent in such registering is reduced or eliminated.

2) The message on the bus/transport need not be received or otherwise processed by the second redundant node, the message need only "pass by" (e.g., bus) or "pass through" (e.g., ring, mesh) the second redundant node so that the comparison can be performed.

3) The comparison is performed by a dedicated/hard-wired/hard-configured circuit so that the comparison consumes little or no processing overhead, consumes little or no additional processor memory space, and adds little or no delay or latency to the broadcast of the message.

4) The generation of the message by the second redundant node is synchronized with the generation of the message by the first redundant node to allow an on-the-fly bit-by-bit or portion-by-portion comparison. The synchronization can be exact or approximate as described above.

5) Referring to FIG. 8, nodes within a redundancy set can be assigned the role of "source" or of "checker." For any single message transmission, one of the redundant nodes will be the source and one or more of the others will be checkers. Such role assignments can be fixed such that each node only plays one particular role for all messages sent by any member of the redundancy set. Or, roles can be assigned on a message-by-message basis. When the latter technique is used, some nodes within a redundancy set may be configured to "sit out" during a particular message transmission, such that it is neither the source nor a checker. When role assignments can be dynamic, the assignments are usually made per a schedule agreed to by all members of the redundancy set. Other possibilities exist. For example, on networks with asynchronous media access, one (by configuring the network) can assign the role of source to the transmitter of the first message that gets onto the network and all other members of the redundancy set become checkers. On networks with non-shared media (e.g., where signals are unidirectional, such as in 100BASE-TX Ethernet), the roles of source and checker can be performed simultaneously by a node (e.g., in a two-node redundancy set, each node can be a source and simultaneously also can be a checker for the other node).

6) Referring to FIG. 10, when the indicator circuit 1009 pulls both lines of the bus 1011 low/high to signal an error, it can pull both lines to low/high for one bus clock cycle, so that for the remaining cycles the remaining bits of the invalid message propagate on the bus, or can pull both lines low/high up to the duration of the invalid message so that once an error is detected, no further bits of the invalid message propagate on the bus.

For example, while "killing" a single bit can be sufficient (e.g., can cause a CRC error as the indication of invalid) in some cases, killing more than one bit can be better. Referring to FIG. 10, one way this is done is by having the XOR gate 1004 set a flip-flop (not shown in FIG. 10) to its logic 1 state for a miscompare and the output of the flip-flop controls the bus-killing transistors 1007 and 1008. This flip-flop then is reset to its logic 0 state sometime between the end of one message and the beginning of the next message. Another way of doing this is to have the XOR gate 1004 trigger the one-shot 1006, which has an output that lasts for a set number of bit times and controls the bus-killing transistors 1007 and 1008.

7) Circuitry for synchronizing the redundant nodes, or the messages output by these nodes, for a bit-by-bit comparison by the XOR gate 1004 could be shown as the output of receiver 1003 feeding a re-synchronization block (not shown in FIG. 10) that then controls node 1001. A resynchronization mechanism typically contains a (beginning-of) message detector that compares the time of arrival of a message to its expected time of arrival (per the node's local clock) and adjusts the local clock accordingly. Such circuitry and techniques can be conventional.

In an embodiment, it is typically better that redundancies reside in different nodes rather than within one node, in order to reduce the probability of a failure in one redundancy affecting another. Each redundant node buffers its output for transmission, regardless of whether an actual transmission takes place, depending on its role of source or checker. What the above-described techniques and circuits can eliminate is other buffers to receive redundant copies of messages from other nodes.

Example Embodiments

Example 1 includes a method, comprising: receiving each of at least one input-data message; comparing each of the at least one received input-data message to a list of input-data-message identifiers; and for each of the at least one input-data message that corresponds to a respective input-data-message identifier, generating a respective portion of a first status message, the respective portion indicating that the input-data message was received.

Example 2 includes the method of Example 1 wherein comparing each of the at least one received input-data message to a list of input-data-message identifiers includes comparing a message identifier of the received input-data message to the list of input-data-message identifiers.

Example 3 includes the method of any of Examples 1-2 wherein generating a respective portion of a first status message includes setting a respective bit of the first status message to a value indicating that the input-data message was received.

Example 4 includes the method of any of Examples 1-3 wherein generating a respective portion of a first status message includes transitioning a respective bit of the first status message from a value indicating that the input-data message was not received to a value indicating that the input-data message was received.

Example 5 includes the method of any of Examples 1-4, further comprising: receiving a second status message; comparing the first status message to the second status message; and generating an agreement message that indicates, for each portion of the first status message, whether the portion equals a corresponding portion of the second status message.

Example 6 includes the method of any of Examples 1-5, further comprising: receiving a second status message; comparing the first status message to the second status message; generating an agreement message that indicates, for each portion of the first status message, whether the portion equals a corresponding portion of the second status message; and processing data in the input-data message in response to the agreement message.

Example 7 includes a computing node, comprising: a computing circuit configured to receive each of at least one input-data message; a comparing circuit configured to compare each of the at least one received input-data message to a list of input-data-message identifiers; and an indicator circuit configured, for each of the at least one input-data message that corresponds to a respective input-data-message identifier, to generate a respective portion of a first status message, the respective portion indicating that the input-data message was received.

Example 8 includes the computing node of Example 7, wherein the comparing circuit is further configured to compare a respective message identifier of each of the at least one received input-data message to the list of input-data-message identifiers.

Example 9 includes the computing node of any of Examples 7-8, wherein the indicator circuit is further configured to include setting a respective bit of the first status message to a value indicating that the input-data message was received.

Example 10 includes the computing node of any of Examples 7-9, wherein the indicator circuit is further configured to transition a respective bit of the first status message from a value indicating that the input-data message was not received to a value indicating that the input-data message was received.

Example 11 includes the computing node of any of Examples 7-10, wherein: the computing circuit is further configured to receive a second status message; the comparing circuit is further configured to compare the first status message to the second status message; and the indicator circuit is further configured to generate an agreement message that indicates, for each portion of the first status message, whether the portion equals a corresponding portion of the second status message.

Example 12 includes the computing node of any of Examples 7-11, wherein: the computing circuit is further configured to receive a second status message; the comparing circuit is further configured to compare the first status message to the second status message; the indicator circuit is further configured to generate an agreement message that indicates, for each portion of the first status message, whether the portion equals a corresponding portion of the second status message; and a processing circuit configured to process data in the input-data message in response to the agreement message.

Example 13 includes a tangible non-transient readable medium storing instructions that, when executed by a computing circuit, cause the computing circuit or another circuit under control of the computing circuit: to receive each of at least one input-data message; to compare each of the at least one received input-data message to a list of input-data-message identifiers; and for each of the at least one input-data message that corresponds to a respective input-data-message identifier, to generate a respective portion of a first status message, the respective portion indicating that the input-data message was received.

Example 14 includes the tangible non-transient readable medium of Example 13 wherein the instructions, when executed by a computing circuit, cause the computing circuit or another circuit under control of the computing circuit: to receive a second status message; to compare the first status message to the second status message; and to generate an agreement message that indicates, for each portion of the first status message, whether the portion equals a corresponding portion of the second status message.

From the foregoing, it will be appreciated that, although specific embodiments have been described herein for purposes of illustration, various modifications may be made without deviating from the spirit and scope of the disclosure. Furthermore, where an alternative is disclosed for a particular embodiment, this alternative may also apply to other embodiments even if not specifically stated. Moreover, the circuit components described above may be disposed on a single or multiple integrated circuit (IC), one or more microprocessors, or one or more microcontrollers. In addition, one or more components of a described apparatus or system may have been omitted from the description for clarity or another reason. Furthermore, one or more components of a described apparatus or system that have been included in the description may be omitted from the apparatus or system.

What is claimed is:

1. A method, comprising:
   receiving a list of input-data-message identifiers of each of at least one input-data message;
   receiving, at a first node, each of the at least one input-data message that the first node is to operate on to perform a redundant task;
   comparing each of the at least one received input-data message to the list of input-data-message identifiers; and
   for each of the at least one input-data message that corresponds to a respective input-data-message identifier, generating a respective portion of a first status message, the respective portion indicating that the corresponding input-data message was received,
   comparing the first status message to a second status message from a second node to determine whether the first node and the second node have received the corresponding input-data message.

2. The method of claim wherein comparing each of the at least one received input-data message to the list of input-data-message identifiers includes comparing a message identifier of the received input-data message to the list of input-data-message identifiers.

3. The method of claim wherein generating the respective portion of the first status message includes setting a respective bit of the first status message to a value indicating that the corresponding input-data message was received.

4. The method of claim wherein generating the respective portion of the first status message includes transitioning a respective bit of the first status message from a value indicating that the corresponding input-data message was not received to a value indicating that the corresponding input-data message was received.

5. The method of claim 1, further comprising:
   generating an agreement message that indicates whether each portion of the first status message equals a corresponding portion of the second status message.

6. The method of claim 1, further comprising:
   generating an agreement message that indicates whether each portion of the first status message equals a corresponding portion of the second status message; and
   processing data in the corresponding input-data message in response to the agreement message.

7. A computing node, comprising:
   a data-storage device configured to receive a list of input-data-message identifiers of each of at least one input-data message;
   a computing circuit configured to receive each of the at least one input-data message that the computing node is to operate on to perform a redundant task;
   a comparing circuit configured to compare each of the at least one received input-data message to the list of input-data-message identifiers; and
   an indicator circuit configured, for each of the at least one input-data message that corresponds to a respective input-data-message identifier, to generate a respective portion of a first status message, the respective portion indicating that the corresponding input-data message was received,
   the computing node being configured to compare the first status message to a second status message from a second node to determine whether the first node and the second node have received the corresponding input-data message.

8. The computing node of claim 7, wherein the comparing circuit is further configured to compare a respective message identifier of each of the at least one received input-data message to the list of input-data-message identifiers.

9. The computing node of claim 7, wherein the indicator circuit is further configured to include setting a respective bit of the first status message to a value indicating that the corresponding input-data message was received.

10. The computing node of claim 7, wherein the indicator circuit is further configured to transition a respective bit of the first status message from a value indicating that the corresponding input-data message was not received to a value indicating that the corresponding input-data message was received.

11. The computing node of claim 7, wherein:
    the computing circuit is further configured to receive the second status message;
    the comparing circuit is further configured to compare the first status message to the second status message; and
    the indicator circuit is further configured to generate an agreement message that indicates whether each portion of the first status message equals a corresponding portion of the second status message.

12. The computing node of claim 7, wherein:
    the computing circuit is further configured to receive the second status message;
    the comparing circuit is further configured to compare the first status message to the second status message;
    the indicator circuit is further configured to generate an agreement message that indicates whether each portion of the first status message equals a corresponding portion of the second status message; and
    a processing circuit configured to process data in the corresponding input-data message in response to the agreement message.

13. The computing node of claim 7, wherein the data-storage device is configured to store the list of input-data-message identifiers in a look-up table.

14. The computing node of claim 7, wherein the first status message and the second status message are message-status buffers.

15. A tangible non-transient readable medium storing instructions that, when executed by a computing circuit, cause the computing circuit or another circuit under control of the computing circuit:

to receive a list of input-data-message identifiers of each of at least one input-data message;

to receive, at a first node, each of the at least one input-data message that the first node is to operate on to perform a redundant task;

to compare each of the at least one received input-data message to a list of input-data-message identifiers; and for each of the at least one input-data message that corresponds to a respective input-data-message identifier, to generate a respective portion of a first status message, the respective portion indicating that the corresponding input-data message was received, and to compare the first status message to a second status message from a second node to determine whether the first node and the second node have received the corresponding input-data message.

16. The tangible non-transient readable medium of claim 15, wherein the instructions, when executed by a computing circuit, cause the computing circuit or another circuit under control of the computing circuit:

to generate an agreement message that indicates whether each portion of the first status message equals a corresponding portion of the second status message.

17. The tangible non-transient readable medium of claim 15, wherein to compare each of the at least one received input-data message to a list of input-data-message identifiers includes to compare a message identifier of the received input-data message to the list of input-data-message identifiers.

18. The tangible non-transient readable medium of claim 15, wherein to generate the respective portion of the first status message includes to set a respective bit of the first status message to a value indicating that the corresponding input-data message was received.

19. The tangible non-transient readable medium of claim 15, wherein to generate the respective portion of the first status message includes to transition a respective bit of the first status message from a value indicating that the corresponding input-data message was not received to a value indicating that the corresponding input-data message was received.

20. The tangible non-transient readable medium of claim 15, wherein the instructions, when executed by a computing circuit, cause the computing circuit or another circuit under control of the computing circuit:

to generate an agreement message that indicates, for each portion of the first status message, whether each portion of the first status message equals a corresponding portion of the second status message; and to process data in the corresponding input-data message in response to the agreement message.

* * * * *

UNITED STATES PATENT AND TRADEMARK OFFICE
CERTIFICATE OF CORRECTION

PATENT NO. : 11,121,910 B2
APPLICATION NO. : 16/600396
DATED : September 14, 2021
INVENTOR(S) : Brendan Hall et al.

Page 1 of 1

It is certified that error appears in the above-identified patent and that said Letters Patent is hereby corrected as shown below:

In the Claims

At Column 21, Claim 2, Line 43, please replace "The method of claim wherein" with --The method of claim 1, wherein--

At Column 21, Claim 3, Line 48, please replace "The method of claim wherein" with --The method of claim 1, wherein--

At Column 21, Claim 4, Line 52, please replace "The method of claim wherein" with --The method of claim 1, wherein--

Signed and Sealed this
Second Day of November, 2021

Drew Hirshfeld
*Performing the Functions and Duties of the*
*Under Secretary of Commerce for Intellectual Property and*
*Director of the United States Patent and Trademark Office*